Dec. 14, 1937. A. A. VUCCINO Re. 20,592

ASHTRAY

Original Filed March 18, 1935

Inventor

Albert A. Vuccino.

By J. Kaplan

Attorney

Reissued Dec. 14, 1937

Re. 20,592

UNITED STATES PATENT OFFICE 20,592

ASHTRAY

Albert A. Vuccino, New York, N. Y.

Original No. 2,028,304, dated January 21, 1936, Serial No. 11,700, March 18, 1935. Application for reissue May 15, 1937, Serial No. 142,841

9 Claims. (Cl. 131—51)

This invention relates to a combination ash tray and cigar and cigarette extinguishing device.

The main object of the invention is to provide an ash tray for holding the burnt out ashes of cigars and cigarettes and having liquid means for extinguishing the lighted ends thereof.

Another object of the invention is to provide the device with a water reservoir for supplying water to the extinguishing means.

Another object of the invention is to regulate the amount of water supplied to the extinguishing means.

A still further object of the invention is to provide a swinging trough partly submerged in a reservoir of water for carrying the water from the reservoir to the extinguishing means and then back again to the reservoir.

Other objects will appear as the disclosure progresses. The drawing is merely intended to indicate a possible embodiment of the invention. It is obvious that the actual needs of manufacture may necessitate certain mechanical changes. It is therefore not intended to limit the invention to the embodiment illustrated but rather to define such limits in the appended claims.

Figure 1:
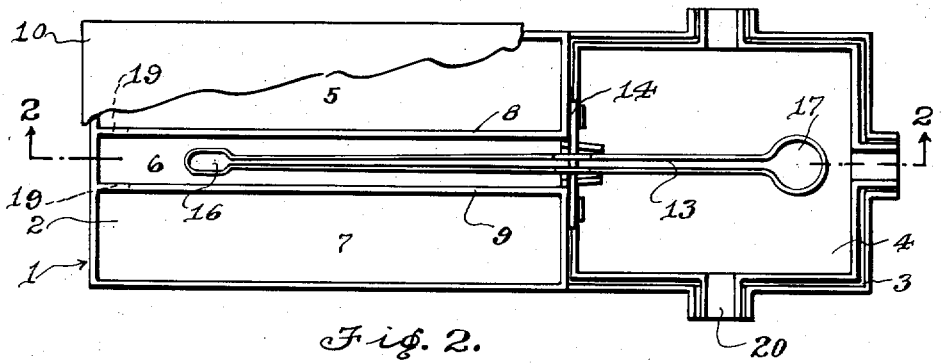
Figure 1 is a top view of the device with the cover partly broken away.

Referring now to the drawing in detail it will be seen that the device comprises a body 1 divided into a reservoir 2 for holding a supply of water and a compartment 3 for holding an ash tray 4. The reservoir is divided into three longitudinal compartments 5, 6, and 7 by the walls 8 and 9. Above the reservoir is a cover 10.

Mounted in the longitudinal center of the device on bearings 11 attached to the wall 12 is a swinging water trough 13. A pin 14 passes through ears 15 in the trough and fits in said bearings. The bearings are open at the top so the trough can be removed when necessary. At both ends of the trough are cups 16 and 17. The cup 16 is normally submerged in the water 18 contained in the reservoir. The portion of the trough housed in the reservoir is longer and overbalances the protruding portion.

Figure 2:
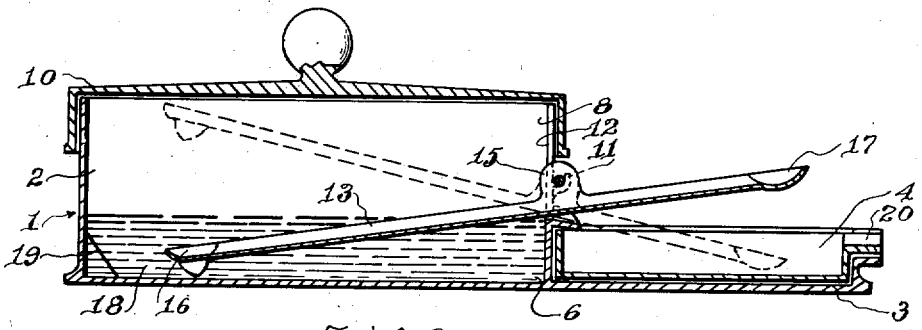
Figure 2 is a section on line 2—2 of Figure 1.
Figure 3:
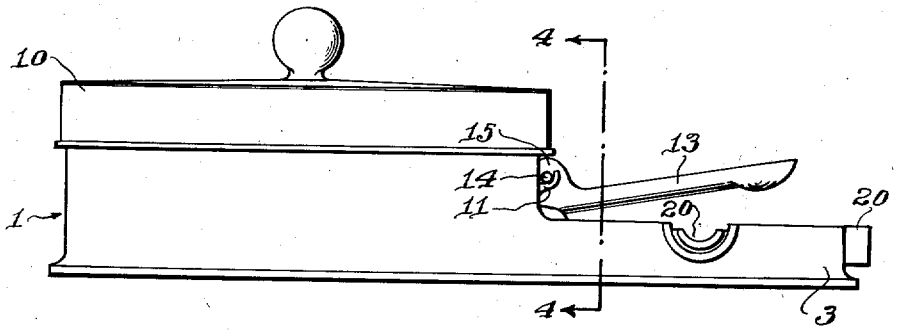
Figure 3 is a side view of the device.
Figure 4:
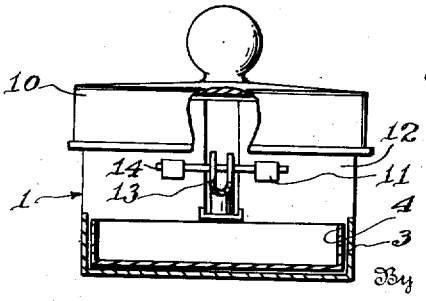
Figure 4 is a section on line 4—4 of Figure 3.

The operation of the device is as follows: The reservoir 2 is filled with water 18, the openings 19 in the walls 8 and 9 allowing the water to flow from one compartment to the other compartments and the swinging trough mounted on its bearings. Now when it is desired to extinguish a cigarette, the cigarette with its lighted end is placed in the cup 17 and pressed down so the trough will swing down as shown in dotted lines in Figure 2. As the submerged cup 16 is lifted up the small amount of water contained in said cup and in part of the submerged trough will flow down to the cup 17 and extinguish the lighted end of the cigarette. When the weight on the cup 17 is released the trough will fall back to its natural position as shown in full lines in Figure 2. The capacity of the cup 17 is greater than the capacity of the submerged end of the trough so there will be no overflow when the cup 17 is swung downwardly. Numeral 20 designates a set of grooved cups for holding the cigars or cigarettes.

It will thus be seen that I have provided a novel, efficient and simple constructed device for extinguishing the lighted ends of cigarettes and cigars and for holding their ashes. The oscillating trough is removably held in place so it can be easily removed. The tray 4 can also be removed to clean out the ashes.

Having described my invention, I claim:

1. In an ash tray and the like, means for holding a supply of liquid, and a swingable liquid-conveying member associated with said means, one end of said member being adapted to be normally submerged in said liquid while the other end is raised above the level of said liquid, whereby when said other end is depressed the liquid is caused to flow thereto.

2. In an ash tray and the like, means for holding a supply of liquid, a swingable liquid-conveying member associated with said means, and liquid-containing means at the ends of said member, one end of said member being adapted to be normally submerged in said liquid while the other end is raised above the level of said liquid whereby when said other end is depressed the liquid is caused to flow thereto.

3. In an ash tray and the like, means for holding a supply of liquid, and a swingable trough associated with said means, one end of said trough being adapted to be normally submerged in said liquid while the other end is raised above the level of said liquid, whereby when said other end is depressed the liquid is caused to flow thereto.

4. In an ash tray and the like, means for holding a supply of liquid, a swingable liquid-conveying member associated with said means, and cups at the ends of said member, one end of said member being adapted to be normally submerged in said liquid while the other end is raised above the level of said liquid, whereby when said other end is depressed the liquid is caused to flow thereto.

5. In an extinguishing device, a container having a compartment for a supply of liquid and an outwardly extending compartment for an ash tray; and a swingable liquid-conveying member associated with said container, one end of said member being adapted to be normally submerged in said liquid while the other end is raised above the level of said liquid, whereby when said other end is depressed the liquid is caused to flow thereto.

6. In an ash tray and the like, means for holding a supply of liquid, a wall connected with said means, and a swingable liquid-conveying member removably mounted on said wall, one end of said member being adapted to be normally submerged in said liquid while the other end is raised above the level of said liquid, whereby when said other end is depressed the liquid is caused to flow thereto.

7. In an ash tray and the like, means for holding a supply of liquid, a wall connected with said means, bearings attached to said wall, and a swingable liquid-conveying member mounted in said bearings, one end of said member being adapted to be normally submerged in said liquid while the other end is raised above the level of said liquid, whereby when said other end is depressed the liquid is caused to flow thereto.

8. In an extinguishing device, a container having at least two compartments, one of said compartments being adapted to form a reservoir for a supply of liquid, an ash tray resting in the other one of said compartments, and a swingable liquid-conveying member associated with said container, one end of said member being adapted to be normally submerged in said liquid while the other end is raised above the level of said liquid, whereby when said other end is depressed the liquid is caused to flow thereto.

9. In an ash tray and the like, a container having a supporting member dividing said container into a liquid containing portion and an ash receiving portion, and a swingable liquid-conveying member carried by said supporting member and having a longer end adapted to be normally resting within said liquid-containing portion and be submerged in said liquid, and a shorter end extending over said ash receiving portion, whereby when said shorter end is depressed the liquid is caused to flow thereto.

ALBERT A. VUCCINO.